United States Patent [19]
de Putter et al.

[11] 4,150,087
[45] * Apr. 17, 1979

[54] TUBE OF THERMOPLASTICS WITH THICKENED END

[75] Inventors: Warner J. de Putter, Hardenberg; Willem C. Den Hertog, Ommen, both of Netherlands

[73] Assignee: Wavin B.V., Zwolle, Netherlands

[*] Notice: The portion of the term of this patent subsequent to Aug. 12, 1992, has been disclaimed.

[21] Appl. No.: 747,345

[22] Filed: Dec. 3, 1976

Related U.S. Application Data

[63] Continuation of Ser. No. 595,061, Jul. 11, 1975, abandoned, which is a continuation-in-part of Ser. No. 352,329, Apr. 18, 1973, Pat. No. 3,899,565.

[30] Foreign Application Priority Data

Apr. 19, 1972 [NL] Netherlands .......................... 7205280

[51] Int. Cl.² .............................................. B29D 23/00
[52] U.S. Cl. .................................... 264/296; 264/322; 264/327; 425/393; 425/DIG. 218
[58] Field of Search .............. 264/294, 296, 322, 327; 425/384, 392, 393, DIG. 218

[56] References Cited

U.S. PATENT DOCUMENTS

| | | | |
|---|---|---|---|
| 3,237,243 | 3/1961 | Saumsiegle | 425/384 |
| 3,360,826 | 1/1968 | Lorang | 18/19 |
| 3,635,639 | 1/1972 | Kresbach | 425/392 X |
| 3,843,300 | 10/1974 | McFarlane | 264/322 X |
| 3,899,565 | 8/1975 | Putter | 264/296 |

FOREIGN PATENT DOCUMENTS 38-16336 1963 Japan ....................................... 264/320

Primary Examiner—Thomas P. Pavelko
Attorney, Agent, or Firm—Watson, Cole, Grindle & Watson

[57] ABSTRACT

A tube of thermoplastic material is heated to plasticity, whereupon the heated tube is provided with a thickened end by subjecting the tube to an upsetting action in such a way that the thickening starts at a distance from the free end of the heated part and increases gradually from this point towards the free end of the heated part.

7 Claims, 8 Drawing Figures

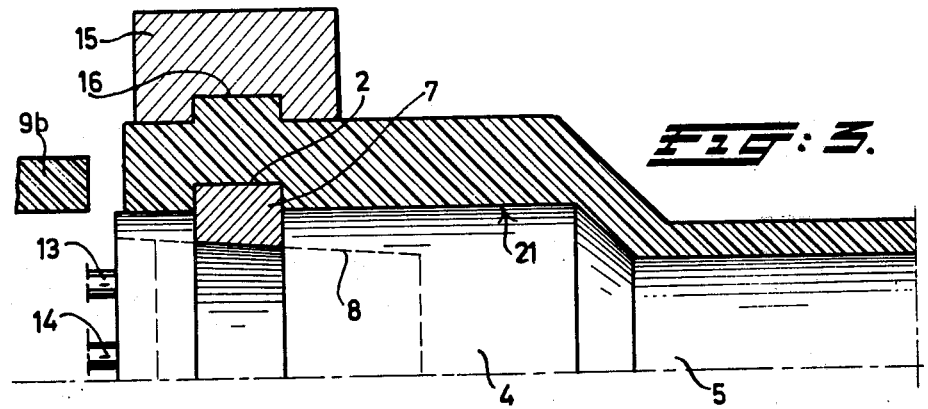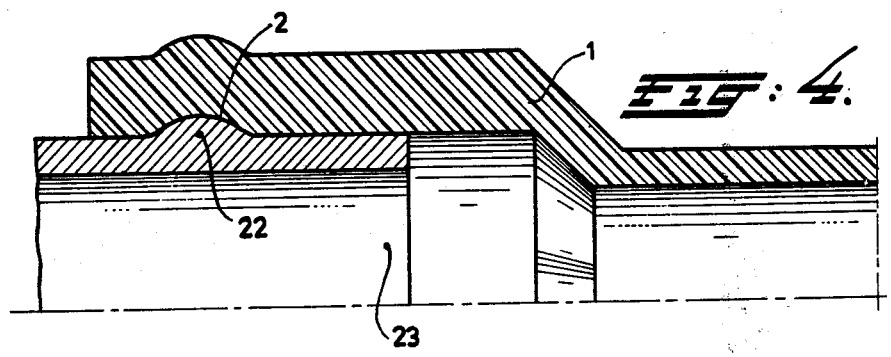

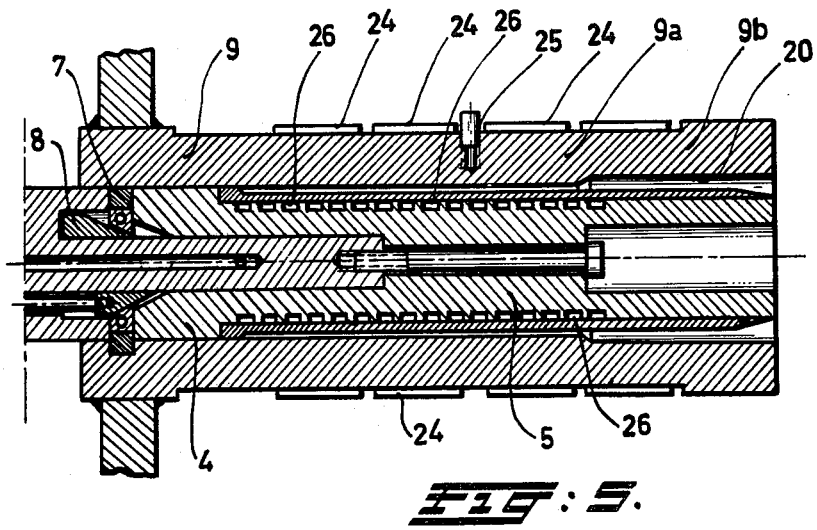
FIG:5.
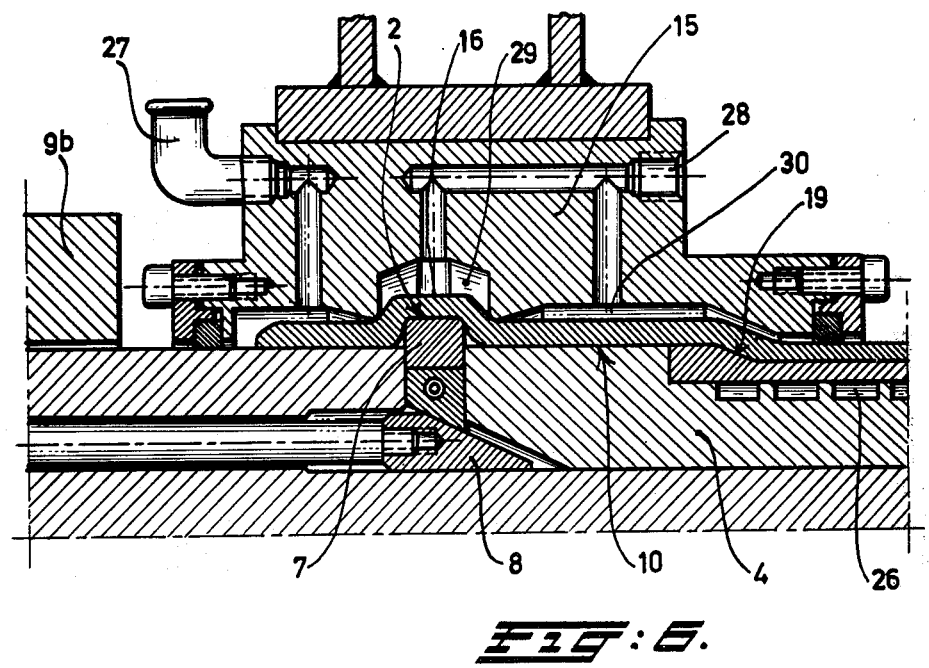
FIG:6.

TUBE OF THERMOPLASTICS WITH THICKENED END

This application is a continuation application of application Ser. No. 595,061 filed on July 11, 1975, now abandoned, which was a continuation-in-part application of application Ser. No. 352,329 filed on Apr. 18, 1973, now U.S. Pat. No. 3,889,565.

BACKGROUND OF THE INVENTION

The present invention relates to a method for providing a tube of thermoplastic material with a thickened end by subjecting a tube end, which has been brought into a deformable state by applying heat, to an upsetting action.

Such a method is known per se. According to this known method, during the extrusion of a tube the discharge rate of the tube is reduced such that, in a part thereof, a greater wall thickness is produced. This part of the tube with thickened wall is thereupon, by a separate operation, provided with a socket end and a groove, if desired. The formation of the tube part with thickened wall during extrusion is, however, attended with the drawback that it is impossible to obtain a wall thickening which meets well-defined conditions.

SUMMARY OF THE INVENTION

This invention aims to provide a method for manufacturing a tube of thermoplastic material with a thickened end part by deformation of a part of the tube which has been brought into a deformable state by heating.

This is, according to the invention, attained by an arrangement wherein:
 (a) an end part of the tube is heated to at least the deformation temperature,
 (b) this end part of the tube is thickened by subjecting the tube to an upsetting operation until the inner- and outer-side of the thickened part are supported by an inner and outer supporting wall which are situated with respect to each other at a predetermined distance, and
 (c) the thickening is caused to start from a point at distance from the free end of the heated tube part and this thickening increases gradually from this point towards the free end.

In this way the thickened end presents excellent strength properties due to the fact that the thickened part is free from wrinkles which are always formed if the thickening starts from the free end and increased gradually from this end. An increase of the strength properties of 500% is observed.

According to a preferred embodiment of the invention, at least one of the inner sides and outer sides of the thickened part of the tube is cooled down in such a way that on removal of the outer supporting wall, the thickened part of the tube substantially retains its form. On the other hand, cooling is performed in such a manner that after removal of the outer supporting wall, the heat in a particular cross-sectional area is sufficient to bring this entire cross-sectional area up to at least the temperature of deformation. The thickened part is then socketed and provided with an inner groove, if desired.

It has found that in the manner described above a tube with a thickened socket end with an annular inner groove can be easily manufactured. Initially an end of the tube is furnished with a thickened portion due to an upsetting operation as indicated hereinbefore, and after the thickening operation, the inner- and/or outer side of the thickened pipe part is subjected to such a cooling treatment such that the thickened tube part retains its shape. On the other hand, however, after removal of the outer supporting wall, the heat in a particular cross-section is sufficient to bring again this entire cross-section at least up to its deformation temperature. The cooling of the inner- and/or outer side however, is necessary to prevent particular shape variation that could occur in view of the elastic tendency of the plastic, and moreover prevents creases which could easily be formed when the tube is being slid over a socket-forming mandril. Cooling can be effected in a simple way by cooling the outer or inner supporting wall or both.

It is efficiently arranged that the inner or outer side or both of the thickened tube part are cooled in such a manner that a skin forms around the tube, having a temperature which is at least 10° lower than the temperature of the thickened plastic mass. This is satisfactorily achieved by keeping the inner side of the outer supporting wall below the deformation temperature of the plastic, but over 50° C. The deformation temperature of the plastic is a temperature above the plasticity temperature for e.g. polyvinylchloride with a temperature ranging from 130° to 150° C., for example 140° C.

The present invention also relates to tubes formed while performing the method according to the invention.

BRIEF DESCRIPTION OF THE DRAWINGS

FIG. 3 shows yet another position of the socket-forming mandril and the hollow die and also a die disposed around the tube for the formation of an annular groove;

FIG. 4 shows a longitudinal section of a part of a device according to the invention for thickening the end part of a plastics tube;

FIG. 5 shows a longitudinal section of a part of a device for forming the groove;

FIG. 6 shows a sectional view of a device for performing the invention.

DESCRIPTION OF PREFERRED EMBODIMENT

Figure 1:
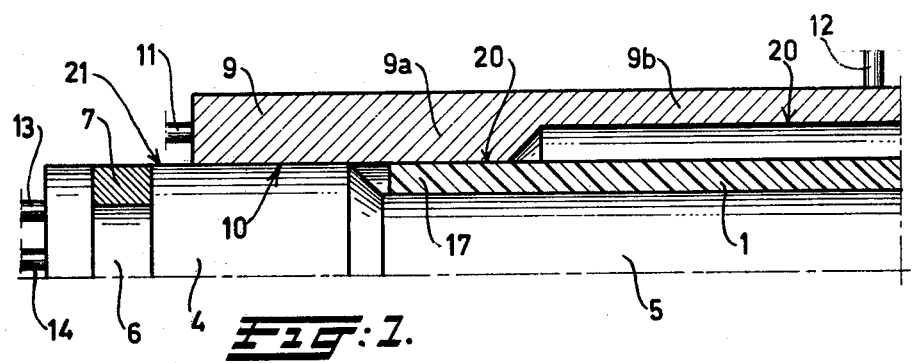
FIG. 1 diagrammatically illustrates a device for performing the invention in a particular position of the socket-forming mandril with the core part and hollow mould.
Figure 1A:
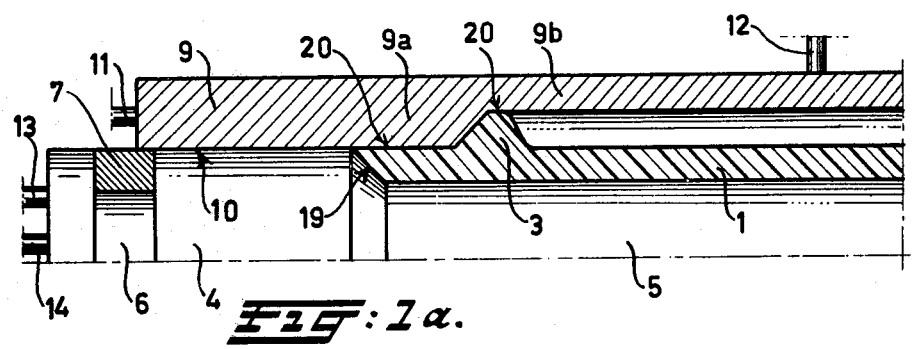
FIG. 1a shows the start of the thickening at distance from the free end of the tube.
Figure 1B:
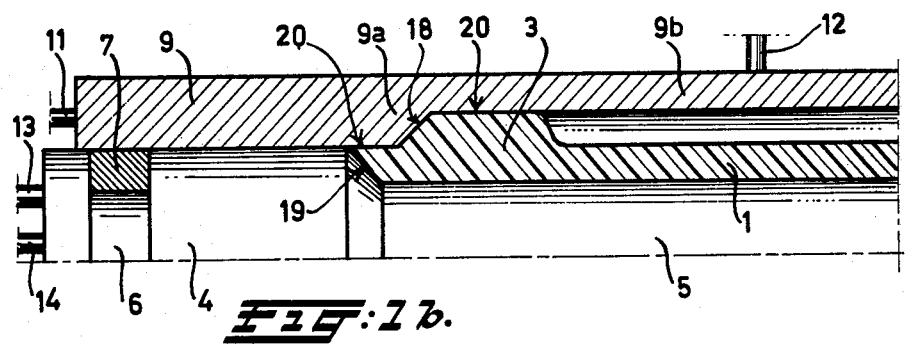
FIG. 1b the formation of the thickening in an intermediate stage.

In FIG. 1 a device is illustrated for providing a plastic tube 1 with a thickened wall 3 in a socketed end. This device includes an interconnected socket-forming mandril 4 and a core part 5, with a diameter smaller than that of the socket-forming mandril 4, connected therewith.

The socket-forming mandril 4 may be provided with a circular recess 6 in which a groove-forming member 7 is situated in the shape of a rubber body which can be pressed from the inner side of the socket-forming mandril 4, by means of a diagrammatically represented cone-shaped expanding part 8.

The device is further provided with a hollow mould 9, the part 9a of which can fittingly cooperate with the outer side 10 of the socket-forming mandril 4. On the other hand, the hollow mould 9 is provided with a part 9b having a greater diameter than the groove-socket-forming mandril 4. The inner diameter of the part 9b is equal to the diameter of the socket-forming mandril 4, to which is added the difference in diameter between the inner diameter of the part 9a of the hollow die and the diameter of the core part 5. The hollow mould 9 is provided with a cooling medium- and/or heating medium inlet 11 and a cooling medium- or heating medium outlet 12. The hollow mould 9 can also be provided with heating tapes 24 and a thermocouple 25 which controls the heating of the heating tapes for maintaining the inner side of hollow mould 9 at the desired temperature.

On the other hand, the socket-forming mandril 4 is likewise provided with a cooling medium inlet 13 and a cooling medium outlet 14.

The hollow mould 9 and the socket-forming mandril 4 together with the core part 5, can be moved in opposite directions with respect to each other along a common axis, this being the axis of the mould.

After the end of the tube has been thickened, the hollow mould 9 is slid away far enough for the formation of the groove that a groove-forming die 15 can be disposed around the socket-forming mandril 4, the die 15 being provided with a recess 16 corresponding with the groove 2 to be formed, if desired.

In some cases it is recommended instead of, or in addition to, providing the socket-forming mandril 4 with cooling means, the forming die 15 is also provided with cooling means.

FIG. 6 shows a first cooling medium inlet 27 for cooling the part besides the groove which is to be formed. The second cooling medium inlet 28 is provided for cooling the region of the outer side of the groove and for cooling the part beside this groove.

For the formation of a tube 1 from thermoplastic synthetic material like polyvinylchloride or polyethylene, with a thickened end, one proceeds as follows:

The end part 17 of a tube 1 made of a non-impact polyvinylchloride is heated up to a temperature ranging from 130° to 150°, for instance 140° C., corresponding with the deformation temperature of the thermoplastic synthetic material. Although the foregoing deals with polyvinylchloride, it is obvious that also other thermoplastic materials known to persons skilled in the art, can be used for this purpose.

This plastic tube 1, with its end part 17 brought into a deformable condition, is slid into the space between the hollow mould 9 and the core part 5 of the socket-forming mandril 4, which fits the end part 17. This situation is represented in FIG. 1.

Figure 2:
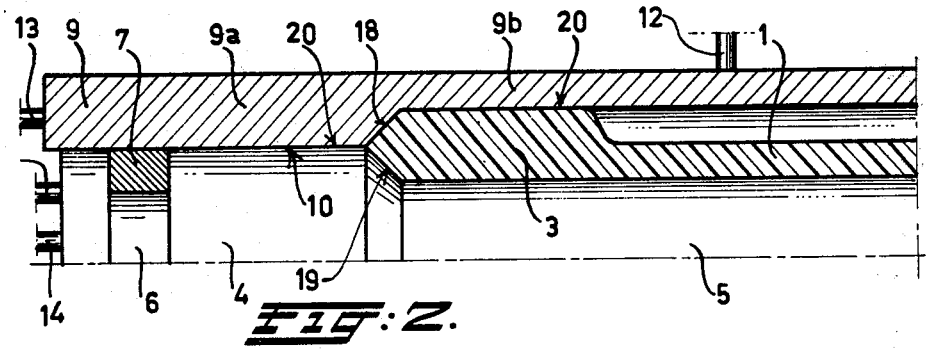
FIG. 2 shows the position of the socket-forming mandril with the core part and the hollow mould provided around the core part at the end of the thickening.

Thereupon the socket-forming mandril 4 and core part 5 are moved in the direction of the arrow towards the right, whereas the hollow mould 9 is moved in the opposite direction. Actually it is also possible to let the hollow mould stand still and to only move the socket-forming mandril 4, while it is also possible to only move the hollow mould 9 towards the left (see arrow) and to subject the non-heated part of the tube next to the heated end part 17 to an upsetting or distortion treatment. It is evident that all possible movements, are permissible which result in a thickening of the tube. During these movements part 9b of the hollow mould 9 moves towards the position represented in FIG. 2 until the bevelled part 19 constituting the bridge part between the socket-forming mandril 4 and the core part 5 adjoins the bevelled part 18 constituting the connecting wall part between part 9a and part 9b of the hollow mould 9. Due to an upsetting action from the non-heated tube part 1b, the thickening starts as a thickened region 3' which gradually increases to form the thickened region 3''. At least the space has in the meantime been entirely filled with plastic, so that the thickened part 3 on the tube 1 is produced. The inner wall 20 has a temperature of over 50° C. and conveniently temperatures of approximately the glass transition point, e.g., 75° C. are selected. After having reached the position shown in FIG. 2, the hollow mould 9 is moved towards the left, whereupon the thickened tube part 3 is slid on the socket-forming mandril 4. This socket-forming mandril is, by means of a medium supplied at 13, kept at such a temperature that the outer wall 21 of the socket-forming mandril 4 has a temperature of over 50° C., but lower than the deformation temperature of the plastic. Preferably a temperature of 75° C. is selected. It should be noted that the temperature of the wall part 20 of the hollow mould 9 should preferably likewise be brought under the deformation temperature of the plastic and that at any rate both the wall 20 and the wall 21 should have a temperature which is lower than that of the plastic mass which has been thickened. In this way a film having a temperature of at least 10° C. below the temperature of the thickened mass is obtained around the plastic, which ensures that no undesired deformations are produced under the influence of the elastic memory of the plastic after removal of the part 9b of the hollow mould. Preferably the thickened part has an inner temperature of 140° C. and an outer skin temperature of 75° C. and preferably an inner skin temperature of 75° C. or reverse.

The above-mentioned film also ensures that along the outer side of the thickened part no undesired deformations are produced in this part owing to the fact that the thickened part slides over the socket-forming mandril when the tube is widened out.

After the formation of the thickened socket end of the tube, a rubber ring 7 is expulsed from the annular groove 6 by means of the conical deforming member 8, after having provided at the location of this recess and externally around the socket end, a mould 15 with a recess 16. Under the influence of ring 7, the plastic mass is pressed into the recess 16 whereby the groove 2 is formed. It will be clear that in this way by consecutively upsetting, thickening, widening out and grooving, a tube of the desired type can be obtained.

The formation of a film over a lower temperature along the outer side of the thickened part, in such a way that the total heat contents of a particular cross-section suffices to bring up again, for example after removal of the outer supporting wall in the shape of the die part 9b, the entire cross-section to at least the deformation temperature is very important. In this way a certain stabilization of the plastic mass is obtained, whereby the elastic memory cannot give rise to trouble.

The groove may also be formed by other means, e.g. a spreader-core or a device as shown in FIG. 4. In this figure the socket-forming mandril is provided at its end with a part having a removable core 23 and parts 22 provided thereon, forming together a circular groove. After having slid the thickened part of the tube over these parts forming together the groove, the removable core is removed whereby the groove-forming parts can be easily removed from the inner side of the tube.

It is obvious that instead of forming the socket and the groove if desired in the aforementioned way, an outer die also could be used, into which the thickened part is blown. In that case the mould 15 extends on the entire thickened part, while within the thickened part provisions can be disposed for inflating and adapting the part to the mould 15.

What we claim is:

1. A method of forming a tube made of a thermoplastic material with a thickened end by deforming the tube which has been brought into a deformable state by heating, comprising the steps of:
   (a) heating the end part of the tube to at least the deformation temperature of the plastic material;
   (b) thickening this end part of the tube by subjecting the tube to an upsetting operation by deforming the tube between a first supporting wall positioned within the tube and a second supporting wall positioned outside of the tube, with the first and second walls being arranged with a predetermined space between them and so deforming the tube until the inner side and outer side of the thickened part are supported by the first and second supporting walls;
   (c) causing the thickening to start from a point spaced a distance from a free end of the heated tube part and then gradually progress from this point towards the free end,
   (d) cooling at least one of the inner sides and outer sides of the thickened part of the tube down so that a skin forms around the tube having a temperature which is at least 10° C. lower than the temperature of the thickened plastic material such that on removal of the second supporting wall the thickened part substantially retains its form, while on the other hand cooling is performed such that after removal of the second supporting wall, the heat in a particular inner cross-sectional area suffices to bring this entire cross-sectional area up to at least the temperature of deformation; and
   (e) subsequently widening the thickened part to form a socket.

2. Method according to claim 1, further comprising the steps of: forming a socket in the thickened part of the tube by sliding the thickened part over a socket-forming mandril; and providing the socket with a circular inner groove.

3. Method according to claim 2, wherein the socket-forming mandril adjoins the first supporting wall.

4. Method according to claim 2, wherein the outer side of the socket-forming mandril is kept at such a temperature that the plastic mass in contact with this socket-forming mandril obtains a temperature which is at least 10° C. lower than the deformation temperature of the plastic tube.

5. Method according to claim 2, wherein the outer wall of the socket-forming mandril and the inner side of the second supporting wall are kept under the deformation temperature of the plastic, but above 50° C.

6. Method according to claim 1, wherein the end part of the tube is thickened without substantially changing the inner diameter of the tube end.

7. A method of forming a thickened end part on a thermoplastic tube comprising the steps of:
   (a) placing the end part of the tube, including the associated free end, between a first cylindrical supporting wall and a second cylindrical supporting wall, said first cylindrical supporting wall being located radially within the associated end part and free end of the tube and the second cylindrical supporting wall being located radially outside the associated end part and free end of the tube, said first and second cylindrical supporting walls being positioned at a point from the free end with a predetermined space therebetween which is larger in dimension than the radial thickness of the end part of the tube, said second cylindrical supporting wall having two flat portions and a bevelled portion therebetween, the flat portion closest to the free end of said tube being closer to the first cylindrical supporting wall than the flat portion farther from the free end;
   (b) heating the end part of the tube so as to allow for deformation and thickening of said end part of the tube adjacent said point which is at a distance from the free end of the tube in order to allow for contact between the expanded end part of the tube and both said first and second cylindrical supporting walls;
   (c) causing said thickening to proceed from said point which is at a distance from said free end towards said free end by moving said second cylindrical supporting wall in relation to said first cylindrical supporting wall in the direction of said end part and associated free end of said tube; and
   (d) cooling at least one of the inner sides and outer sides of the thickened part of the tube down so that a skin forms around the tube having a temperature which is at least 10° C. lower than the temperature of the thickened plastic material, such that on removal of the second supporting wall the thickened part substantially retains its form, while on the other hand cooling is performed such that after removal of the second supporting wall, the heat in a particular inner cross-sectional area suffices to bring this entire cross-sectional area up to at least the temperature of deformation;
   (e) subsequently widening the thickened part to form a socket by moving said second cylindrical supporting wall, and thus said bevelled portion, towards said free end.

* * * * *